(12) United States Patent
Saidi et al.

(10) Patent No.: US 12,457,497 B2
(45) Date of Patent: Oct. 28, 2025

(54) APPARATUS AND METHOD FOR DETECTING PRACH STORM ATTACKS

(71) Applicant: Nokia Solutions and Networks Oy, Espoo (FI)

(72) Inventors: Taofik Saidi, Lannion (FR); Serge Papillon, Paris (FR); Siwar Kriaa, Antony (FR); Renaud Santoro, Lannion (FR); Afef Feki, Sceaux (FR)

(73) Assignee: Nokia Solutions and Networks Oy, Espoo (FI)

( * ) Notice: Subject to any disclaimer, the term of this patent is extended or adjusted under 35 U.S.C. 154(b) by 334 days.

(21) Appl. No.: 18/210,725

(22) Filed: Jun. 16, 2023

(65) Prior Publication Data

US 2023/0413056 A1    Dec. 21, 2023

(30) Foreign Application Priority Data

Jun. 20, 2022    (FI) ..................................... 20225551

(51) Int. Cl.
*H04W 12/121*   (2021.01)
*H04W 12/63*    (2021.01)
(Continued)

(52) U.S. Cl.
CPC ......... *H04W 12/121* (2021.01); *H04W 12/63* (2021.01); *H04W 74/0833* (2013.01); *H04W 74/0838* (2024.01)

(58) Field of Classification Search
CPC ............... H04W 12/121; H04W 12/63; H04W 74/0833; H04W 74/0838
(Continued)

(56) References Cited

U.S. PATENT DOCUMENTS

| 2010/0131751 A1 | 5/2010 | Reznik et al. ................. 713/151 |
| 2012/0155274 A1* | 6/2012 | Wang ................... H04L 63/1458 370/236 |
| 2025/0030731 A1* | 1/2025 | Soryal ................. H04L 63/1416 |

FOREIGN PATENT DOCUMENTS

| CN | 113709083 A | 11/2021 |
| CN | 114567884 A | 5/2022 |

(Continued)

OTHER PUBLICATIONS

English Translation of KR-101853698B1, May 2, 2018, KR, Jeon Wha Sook et al. (Year: 2018).*

(Continued)

*Primary Examiner* — Michael Thier
(74) *Attorney, Agent, or Firm* — McCarter & English LLP

(57) ABSTRACT

A method for a physical random access channel (PRACH) attack detection includes detecting by a base station a plurality of preambles sent by devices through a PRACH; launching by the base station a random access (RA) procedure for at least one device for which a preamble has been detected; decoding by the base station at least one radio resource control (RRC) connection request received in the context of a launched RA procedure; determining by the base station a first metric and a second metric, wherein the first metric is the number of RRC connection requests successfully decoded over time, wherein the second metric is the number of preambles detected over the same time and for which a RA procedure has been launched; determining whether there is a suspicion of storm attack over the PRACH based on a result of a comparison of the first and second metrics.

13 Claims, 9 Drawing Sheets

(51) Int. Cl.
*H04W 74/0833* (2024.01)
*H04W 74/0838* (2024.01)

(58) Field of Classification Search
USPC .......................................... 455/410
See application file for complete search history.

(56) References Cited

FOREIGN PATENT DOCUMENTS

KR          101853698 B1    5/2018
WO    WO 2015/166303 A1   11/2015

OTHER PUBLICATIONS

ZTE, "RACH overload solutions," 3GPP TSG RAN WG2 #70bis, R2-103742, Stockholm, Sweden, Jun. 28-Jul. 2, 2010.
"Details of protecting gNB from RRC DoS attack", Huawei, Hisilicon, 3GPP TSG SA WG3 (Security) Meeting #94, S3-190482, Feb. 2019, 3 pages.
Ettiane, Raja, et al., "Toward securing the control plane of 5G mobile networks against DoS threats: Attack scenarios and promising solutions", Journal of Information Security and Applications, Jul. 27, 2021, 10 pages.

\* cited by examiner

APPARATUS AND METHOD FOR DETECTING PRACH STORM ATTACKS

TECHNICAL FIELD

Various example embodiments relate generally to apparatus, method, and computer program for detecting PRACH (Physical Random Access Channel) storm attack.

BACKGROUND

Radio Access Network communications have been subject to various attacks in different mobile networks generations from 2G up to 5G. Even though security between the User Equipment (UE) and the base station have been reinforced in new mobile generations (4G/5G), radio-based attacks are still an issue for all operators and UE manufacturers.

One of the big emerging market for the 5G is IIOT (Industrial Internet of Things). Dedicated Base Stations (BTS; in the 5G networks: gNB) will be deployed/configured to cover industrial campuses with dedicated telecommunication networks or via network slicing. Attackers wanting to target a specific industrial may look to this kind of dedicated Radio Access Network.

Among the various types of attacks, Distributed Denial of Service (DDoS) Attacks in general and in particular the Physical Random Access Channel (PRACH) storm attack can be particularly insidious, preventing legitimate devices to attach to a cell. This attack is a real issue to industrials as it can deny the service of an entire industrial campus leading to heavy financial losses.

A PRACH storm attack is difficult to detect because the attacker sends preambles that complies with the applicable standards for Random Access procedures such that these preambles cannot be distinguished from preamble sent by a genuine User Equipment (UE).

The consequences of such an attack may be one of a degradation of quality indicators (e.g. KPIs, Key Performance Indicator) for the concerned cell, a complete or partial attach DoS, the consumption of the resources (e.g. CPU, Central Processing Unit) of the based station, the occupancy of the cell radio resources used for Random Access procedures, and a global impact on the cell performances possibly leading to base station reset.

SUMMARY

The scope of protection is set out by the independent claims. The embodiments, examples, and features, if any, described in this specification that do not fall under the scope of the protection are to be interpreted as examples useful for understanding the various embodiments and examples that fall under the scope of protection.

According to a first aspect, there is provided a method comprising, detecting by a base station a plurality of preambles sent by devices through a physical random access channel, PRACH; launching by the base station a Random Access, RA, procedure for at least one device for which a preamble has been detected; decoding by the base station at least one Radio Resource Control, RRC, connection request received in the context of a launched RA procedure; determining by the base station a first metric and a second metric, wherein the first metric is the number of RRC connection request successfully decoded over a period of time, wherein the second metric is the number of preambles detected over the same period of time and for which a RA procedure has been launched; determining whether there is a suspicion of storm attack over the PRACH based on a result of a comparison of the first metric with the second metric.

The first metric and the second metric may be determined per beam when several beams are deployed for defining a radio cell coverage of the base station.

Determining whether there is a suspicion of storm attack may include determining that the value of the first metric decreases compared with the value of the second metric and a decrease ratio is over a threshold.

The threshold may be determined based on values of the first and second metrics computed during a learning phase without storm attack.

The method may comprise: sending a message from a physical layer to an upper layer, the message including information related to the first and second metrics.

The method may comprise: launching a PRACH attack detection process when a suspicion of storm attack is determined.

The detection process may be based on an analysis of parameters of signals carrying the detected preambles, wherein the parameters include at least one of a power of a signal peak, a timing delay of a signal peak in a RACH search window and an angle of arrival of the concerned signal.

The analysis may include a correlation analysis between two or more opportunity windows to detect a correlation between values of at least one signal parameter of preambles sent during the two or more opportunity windows, wherein the storm attack is confirmed if a correlation is detected between a first set of preambles sent in a first opportunity window and a second set of preambles sent in at least one second opportunity window, wherein the at least one signal parameter includes at least one of: a time delay within a preamble search window of a signal peak detected for the concerned preamble and a signal power of a signal peak detected for the concerned preamble.

The detection process may include a clustering of the detected preambles into two subsets, the first subset including preambles for which a correlation is detected and a second subset including preambles for which no correlation is detected, wherein the storm attack is confirmed if the size of the first subset is higher than a predefined threshold.

The detection process may include: modifying a value of a configuration parameter applicable to preambles sent through the PRACH so as to reduce a radio cell coverage of the base station; sending by the base station at least one synchronization signal including the modified value of the configuration parameter; making a determination that a device falling outside the radio cell coverage continues to send preambles through the PRACH without taking into account the modified value of the configuration parameter; determining that the device falling outside the radio cell coverage is an attacker device based on the determination.

The configuration parameter may include at least one of a target beam power and a synchronization signal block threshold.

The radio cell coverage of the base station may correspond to a radio coverage of a set of beams and the modified value of the configuration parameter may be transmitted only through a subset of at least one beam for which a suspicion of storm attack has been detected so as to reduce the radio cell coverage selectively in the direction of the at least one beam.

According to another aspect, there is provided a base station, the base station comprising means for performing a method comprising: detecting by a base station a plurality of preambles sent by devices through a physical random access channel, PRACH; launching by the base station a Random Access, RA, procedure for at least one device for which a preamble has been detected; decoding by the base station at least one Radio Resource Control, RRC, connection request received in the context of a launched RA procedure; determining by the base station a first metric and a second metric, wherein the first metric is the number of RRC connection request successfully decoded over a period of time, wherein the second metric is the number of preambles detected over the same period of time for which a RA procedure has been launched; determining whether there is a suspicion of storm attack over the PRACH based on a result of a comparison of the first metric with the second metric.

Generally, the base station comprises means for performing one or more or all steps of a method disclosed herein, e.g. a method according to the first aspect. The means may include circuitry configured to perform one or more or all steps of the method. The means may include at least one processor and at least one memory including computer program code, the at least one memory and the computer program code being configured to, with the at least one processor, cause the apparatus to perform one or more or all steps of the method.

According to another aspect, there is provided non-transitory computer-readable medium storing computer-executable instructions that, when executed by at least one processor at a base station, cause the base station to perform a method comprising: detecting by a base station a plurality of preambles sent by devices through a physical random access channel, PRACH; launching by the base station a Random Access, RA, procedure for at least one device for which a preamble has been detected; decoding by the base station at least one Radio Resource Control, RRC, connection request received in the context of a launched RA procedure; determining by the base station a first metric and a second metric, wherein the first metric is the number of RRC connection request successfully decoded over a period of time, wherein the second metric is the number of preambles detected over the same period of time for which a RA procedure has been launched; determining whether there is a suspicion of storm attack over the PRACH based on a result of a comparison of the first metric with the second metric.

BRIEF DESCRIPTION OF THE DRAWINGS

The accompanying drawings, which are incorporated in and constitute a part of this specification, illustrate example embodiments together with the general description given above, and the detailed description given below.

Figure 1:
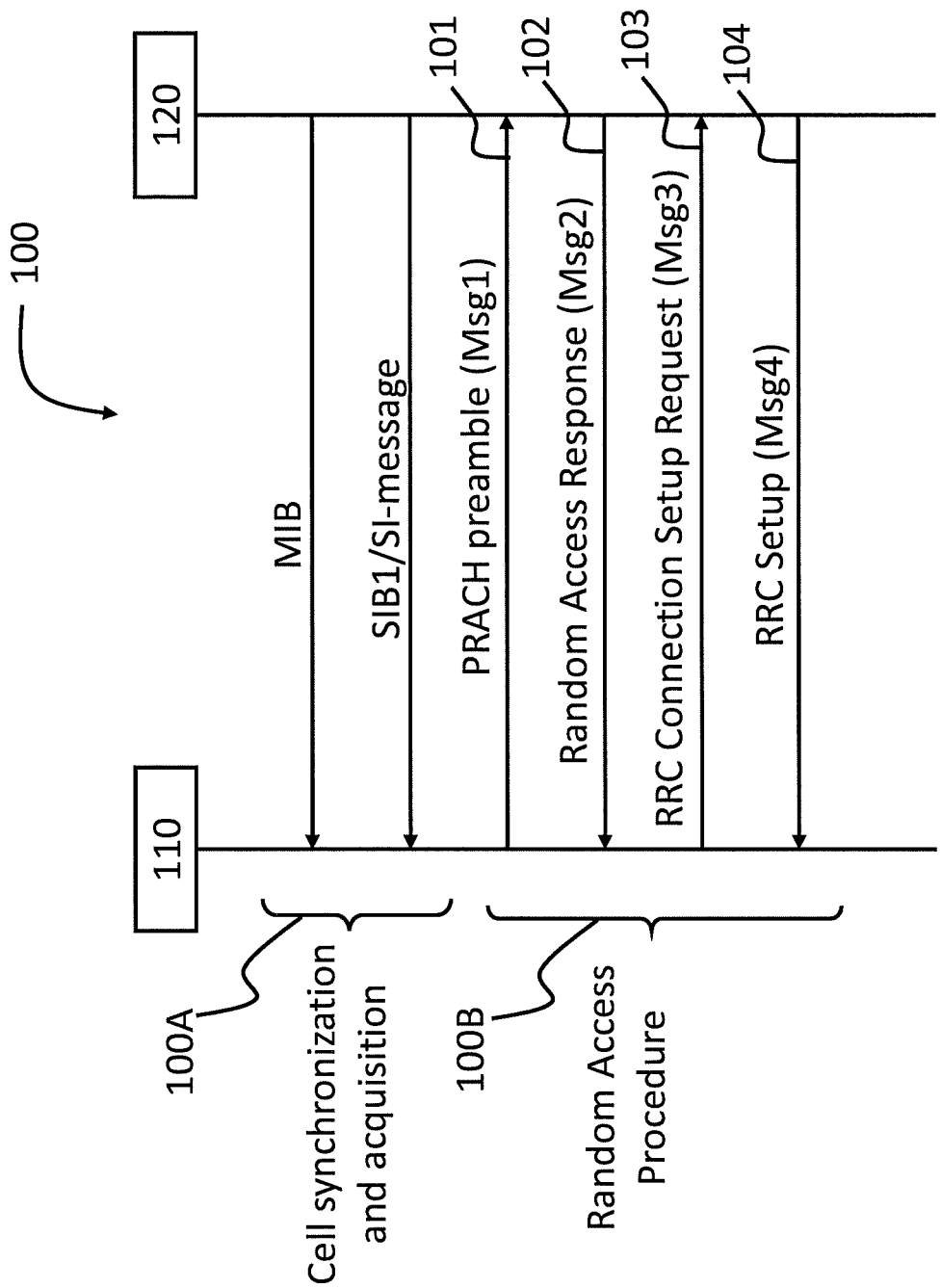
FIG. 1 is a flow diagram illustrating a Random Access procedure, including a UE synchronization procedure to a RAN equipment and an attach procedure for a UE equipment, according to an example.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and functional details disclosed herein are merely representative for purposes of describing example embodiments. However, it will be understood by one of ordinary skill in the art that example embodiments may be practiced without these specific details. The example embodiments may be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

The approach disclosed herein is applicable to the detection of PRACH based attack in radio access networks (RAN) for 4G, 5G systems and beyond. The goal is to allow detecting an attacker performing high number of RACH connections, which consumes all available RACH occasions and prevent authorized UEs (genuine UEs) to realize their proper RACH procedure and connect to the radio access network.

The triggering of the PRACH attack detection process (also referred to herein simply as the detection process) is based on metrics and KPIs which are related to occurred RA procedures and can be easily computed per beam and/or per cell (with or without beamforming deployment).

Several embodiments for PRACH attack detection process allow to confirm the presence or not of an attacker sending a high number of PRACH preambles to request connection to the radio access network. This type of attack is referred to herein as a "storm attack". The PRACH attack detection process may be easily integrated into a base station or a network entity within an O-RAN/RIC framework or any another entity of the network. The PRACH attack detection process may be integrated as an AI/ML-based use case within O-RAN framework.

The approach prevents a total reset of the base station or reset of the attacked radio cell/beam through a smart detection of PRACH attacker presence based on a global analysis of all the preambles received during a given period of time.

As the attacker is making use of the conventional attachment procedure, it is not easy for an operator to differentiate the case of such an attacker with the situation of a high number of authorized UEs trying to connect to the radio access network or any other entity of the network.

A simplified sequence diagram of a random access procedure (RAP) 100B is illustrated in FIG. 1. Prior to the random access procedure (RAP) 100B, a synchronization phase 100A is implemented during which the base station sends synchronization signals on common channels. The synchronization signals carry synchronization signal blocks (SSB).

If beamforming is used, several beams are deployed by the base station for defining a radio cell coverage of the base station. The base station performs beam sweeping selects a beam and a corresponding Synchronization Signal Block (SSB) according to beam power measurement (based on RSRP, Reference Signals Received Power) during cell searching. After the UE selects the beam, the UE decodes the information of the corresponding SSB and determines the RACH configuration (e.g. "RACH-ConfigCommon as defined in 3GPP specification TS 38.331) from the corresponding SSB and SIB1 signal.

The synchronization signal blocks (SSB) include synchronization information (MIB (Master Information Block) carried by physical channel PBCH. The SIB1 (System Information Block 1) is carried by PDSCH physical channels and includes the cell information concerning the resources available to perform the random access procedure in time domain (PRACH format, subframe number to be used for RAP, number of time slots in the subframe, PRACH time occasion indexes, etc) and frequency domain (frequency occasion indexes of the OFDM symbols available for RAP, etc). The synchronization signals also include a parameter rsrp-ThresholdSSB indicating a minimum power level (of the Reference Signals Received Power) to be used by the UE to be under the radio cell coverage of the base station.

After the UE gets PRACH configuration in the synchronization phase 100A, the UE starts to perform the Random Access procedure, RAP, 100B. The Random Access procedure 100B is defined in the 3GPP specification "Medium Access Control (MAC) protocol specification", 3GPP technical specification TS 38.321 v16.8.0, March 2022, for example in section 5.1. Aspects of Random Access preambles and Random Access Procedures are also disclosed in 3GPP technical specification TS 38.300, V17.0.0, see for example section 9.2.6, FIG. 9.2.6-1.

The RAP 100B is performed using the selected beam if beamforming is used for radio cell coverage. Since PRACH resources are accessible to all UEs and two UEs may select a same preamble, the RAP is configured to detect a conflict in case of collision.

The Physical Random Access Channel (PRACH) is used to carry random access preambles used for initiation of random access procedure. The random access procedure 100B is a sequence of messages between a User Equipment (UE) 110 and a base station 120 (e.g. gNB in 5G networks) to acquire uplink synchronization and obtain specific ID for the establishing the radio communication.

The PRACH signal generation (PRACH preambles) is disclosed in the 3GPP specification "Physical channels and modulation", 3GPP technical specification TS 38.211 v16.9.0, March 2022", for example in sections 6.3.3 and 5.3.2. A preamble is an OFDM (orthogonal frequency-division multiplexing) baseband signal.

To obtain dedicated resources for radio access, the UE first uses radio resources (including the PRACH) common to all terminals to contact the base station (in the case of 5G communication networks the base station is designated as the gNB entity but the procedure is similar for other mobile radio accesses) and inform the base station of its access request.

At Step 101, the UE selects randomly one of the 64 available RACH preambles and the UE transmits the selected preamble through the PRACH: the first message Msg1 corresponds to the preamble transmitted by the UE 100 to a base station 120. The UE also needs to provide its own identity to the base station so that the base station can address the UE in next steps. The identity that UE will use is the RA-RNTI (Random Access Radio Network Temporary Identifier) which is determined from the time slot number in which the preamble is sent and other parameters. If UE does not receive any response from the base station, the UE increases its power in fixed step and will send another PRACH signal with the same preamble index. The message Msg1 is transmitted during a specific subframe of a frame, the subframe being identified by a PRACH configuration index which is obtained from SIB1 information sent by the base station during the synchronization phase 100A. Once the preamble is transmitted, the UE terminal listens to the base station's response during a given time window (e.g. defined by the parameter ra-Response Window in 3PPG TS 38.321).

At Step 102, a message Msg2 is sent by the base station to the UE. The message Msg2 is addressed to a UE identified by the RA-RNTI calculated by the base station from the time slot number in which preamble was sent and is sent on PDCCH (Physical Downlink Control Channel). The message Msg2 includes a RAR (Random Access Response) transmitted on the PDSCH (Physical Downlink Shared Channel). The message Msg2 includes the following information:

Temporary identifier (C-RNTI, Cell Radio Network Temporary Identifier) for further communication;

Timing Advance Value, whereby the base station requests the UE to change its timing based on the Timing Advance Value to compensate for the round trip delay caused by UE distance from the base station for the next uplink message; and an Uplink Grant Resource (UL grant), where the base station assigns an initial resource to the UE so that the UE can use PUSCH (Physical Uplink Shared CHannel) for next message Msg3.

At Step 103, using the allocated resource on PUSCH, the UE sends "RRC connection setup request" (RRC, Radio Resource Control) message Msg3 to the base station, where the UE is identified by a temporary identifier (TC-RNTI, Temporary C-RNTI) assigned in the previous step 102 by the base station.

In Step 104: the base station responds to Msg3 with a message Msg4 which is a contention resolution message to the UE whose message Msg3 was received and successfully decoded in step 103. This message Msg4 is sent to the UE identified by the TMSI value or Random number but includes a new C-RNTI which will be used to identify the UE for the further communication. The message Msg4 includes a RRC Connection Setup message.

Random access procedure is considered as failure if the UE doesn't receive messages before timer expires or collision happens on transmitting Msg3. When the UE fails in random access procedure, the UE reselects SSBs or uses the same SSB to transmit the preamble according to RSRP indication included in SSBs after waiting during a backoff window.

The sequence diagram of a random access procedure 100B has been described for a contention-based access. For a contention free access, the messages Msg1, Msg2 and Msg3 are also used. The embodiments of a method for triggering PRACH attack detection disclosed herein are applicable in both cases.

In a PRACH storm attack, the attacker (also referred to herein as the attacking device) targets mainly the first step of the RACH procedure (Msg1 of FIG. 1) in order to highjack all the cell resources and deny access to genuine user equipments. The attacker may first listen the PRACH and may use a power level for Msg1 high enough to be sure that its emission power is above the emission powers used by all UEs for RAP.

The attacker may also monitor downlink (DL) grants for Msg2 and uplink (UL) grants for Msg3 to verify if the base station has detected the "fake" preamble. By this way, the attacker may adapt the attack in various ways. The attacker may use distinct values of Time Advance to simulate various delays as if the attacker would represent distinct UEs having distinct physical locations within the cell. The attacker may select distinct time and/or frequency occasion index for each preamble transmission as if the attacker would represent distinct UEs.

In the context of this document, a 'fake' preamble may be understood as a preamble that complies with the applicable standard but is sent by a malicious device that do not have authorization access and/or a device that wants to disturb the access to the radio network by sending numerous preambles, e.g. with the objective to generate DDoS, spoofing, etc. As will be explained herein, a 'fake' preamble may include or rely on false information: timing delay of the PRACH signal corresponding to a false Time Advance, false UE profile, etc.

Figure 2:
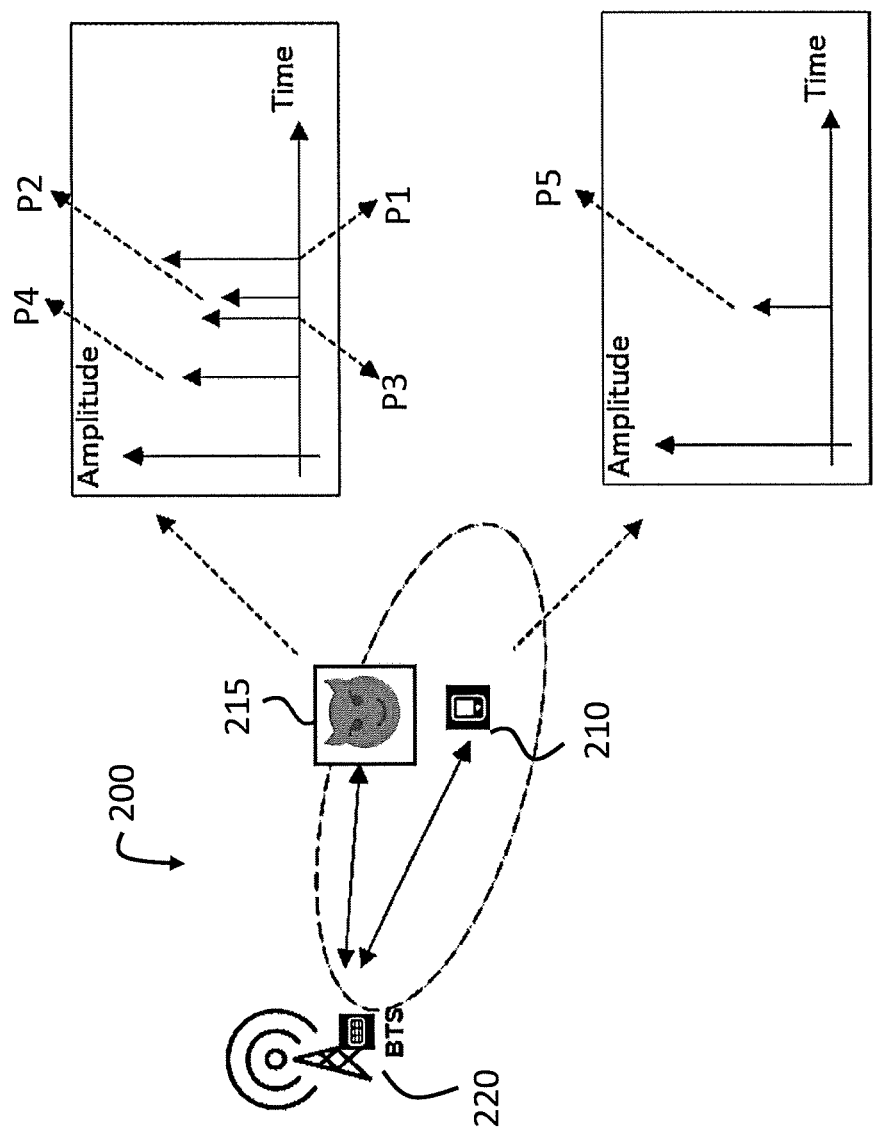
FIG. 2 is a schematic diagram illustrating aspects of a PRACH attack according to an example.

The FIG. 2 illustrates a simplified example of an attack in which 4 possible preambles are configured for a given beam and SSB. At each RACH opportunity window, the attacker 215 transmits all possible fake preambles (i.e. 4 preambles P1, P2, P3 and P4 in this example) with a specific power and timing delay for each preamble (in order to simulate the presence of distinct UEs). Another UE 210 (named here as the victim UE) sends a preamble P5. The 4 fake preambles and the genuine preamble are all detected by the BTS in a predefined preamble search window. For each preamble, the base station 220 selects the highest signal peak of the signal carrying the preamble. As the power of preamble P5 sent by the genuine UE 210 is lower than the power of the fake preambles P1, P2, P3, P4 of the attacker 215, and since there are only 4 possible preambles in a RACH opportunity window, the preamble P5 of the victim UE 210 is not selected by the base station 220 and the base station 220 will not respond to the victim UE 210.

The attacker may behave as follows:
The attacker listen during phase 100A the synchronization signals (MIB/SIB1/SI-m signals) of the synchronization phase A to get the RACH procedure configuration parameters (i.e. time and frequency occasions, etc) for the victim cell;
The attacker transmits during phase 100B fake preambles at each PRACH opportunity window; for example, with beamforming, a limited set of preambles is defined per SSB/beam and all the preambles may be used by the attacker to prevent a genuine UE to send a preamble;
Transmission of each preamble may be performed by the attacker at each opportunity with a power increase (e.g. +3 dB) up to the maximum transmit power as defined in 3GPP technical specification TS 38.321 (cf. section 5.1.3).

Each preamble may be sent with a specific timing delay and a different transmit power to simulate the presence of physically distinct UEs. The goal for the attacker is for the base station to detect different UEs requesting attach to the radio access network.

Note that the attacker could perform this PRACH based attack instead of jamming since the PRACH attack is not easy to detect. Unlike jamming, no interference is created but standard compliant preambles are sent such that by analyzing a single preamble it is not possible to detect that the preamble is sent by an attacker.

To be able to detect an attack, an analysis of all preambles received by a base station and/or all RA procedures is performed during a given period of time. The analysis relies on metrics computed per radio cell or per beam, the metrics showing overall RACH performance for the concerned radio cell or concerned beam. The analysis includes two phases:
phase A: to determine whether there is a suspicion of storm attack over the PRACH; and
phase B: to launch a PRACH attack detection if a suspicion of storm attack has been detected in phase A.

The phase B is executed because after phase A alone, it may not be possible to conclude to a storm attack as various system bugs or other possible malfunctions or the presence of numerous UEs cannot be excluded.

Figure 3:
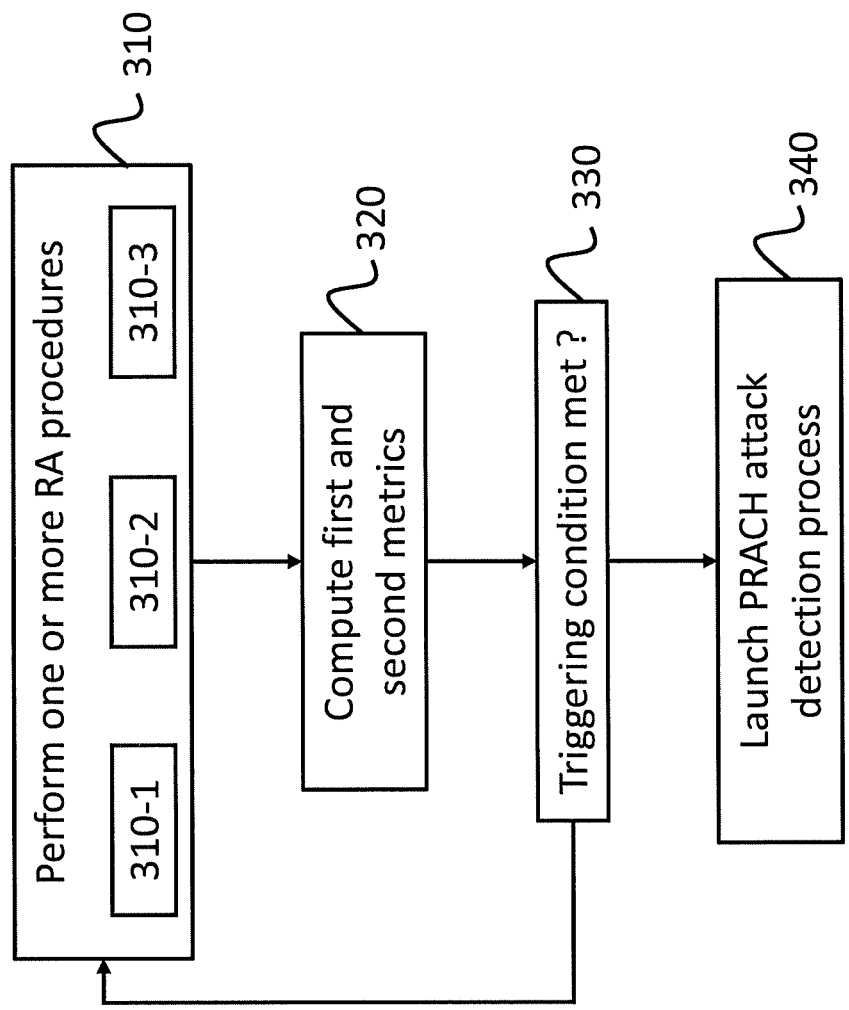
FIG. 3 is a flowchart illustrating a method for triggering PRACH attack detection according to an example.

FIG. 3 is a flowchart of a method 300 for triggering PRACH attack detection. This method corresponds to phase A. The method allows to determine whether a triggering condition is met for launching PRACH attack detection. The method allows to determine whether there is a suspicion of storm attack over the PRACH. A PRACH attack detection process may be launched (phase B) when the triggering condition is met.

The PRACH attack detection is launched only when a predefined triggering condition is verified. To this end, metrics are determined and the triggering condition is checked on the basis of the metrics. When beamforming is used, the metrics may be computed per beam. Otherwise the metrics may be computed per radio cell.

In step 310, the base station performs RA procedures for one or more UEs requesting access to the radio access network during a period of time, referred to herein as the measurement period. The duration of the measurement period is configurable and may correspond for example to 100 radio frames. During this measurement period, the base station performs the following sub-steps.

In sub-step 310-1, the base station detects a plurality of preambles sent by devices through a physical random access channel, PRACH. This sub-step 310-1 may correspond to the execution of one or more steps 101 (Msg1) disclosed by reference to FIG. 1.

In sub-step 310-2, the base station launches a Random Access, RA, procedure for at least one device for which a preamble has been detected during sub-step 310-1. This sub-step 310-2 may correspond to the execution of one or more steps 102 (Msg2) disclosed by reference to FIG. 1.

In sub-step 310-3, the base station decodes at least one Radio Resource Control, RRC, connection request received in the context of a RA procedure launched during sub-step 310-2. This sub-step 310-3 may correspond to the decoding of one or more messages Msg3 received in step 103 disclosed by reference to FIG. 1.

The sub-steps 310-1 to 310-3 may be executed in parallel such that the base station may for example in a sequential manner: 1) detect at least one first preamble; 2) launch at least one first RA procedure based on the at least one first detected preamble; 3) decodes at least one first RRC connection request received in the context of the at least one first RA procedure; 4) detect at least one second preamble; 5) launch at least one second RA procedure based on the at least second detected preamble; 6) decodes at least one second RRC connection request received in the context of the at least one second RA procedure, etc.

In step 320, the base station determines a first metric and a second metric. The first and second metrics are computed for RA procedures performed during the same period of time, referred to herein as the measurement period.

The first metric Rb is the number of RRC connection request successfully decoded over the measurement period. Successfully decoded means in this context that the CRC (Cyclic Redundancy Code) of the Msg3 carrying the RRC connection request is correct. This first metric is useful as the attacker may not necessarily implement a complete RA procedure for all the preambles sent by this attacker and will most probably not send any Msg3 message to save hardware and computation resources.

The second metric Ab is the number of preambles detected over the same measurement period for which a RA procedure has been launched. It is to be noted that the base station (e.g. layer L2 of the base station) does not necessarily trigger a RA procedure for each preamble detected by the base station (e.g. for each preamble reported by the layer L1 of the base station to the layer L2 of the base station). According to 3GPP technical specification TS 38.300, the layer L1 corresponds to the physical layer "sublayer PHY" and L2 corresponds to the "sublayer MAC".

When beamforming is used (i.e. when several beams are deployed for defining a radio cell coverage of the base station), the first metric and the second metric may be determined per beam. The reason is that the attacker will probably be able (due to limitation in terms of hardware resources) to send preambles through only a reduced number of beams, probably only one beam, such that only a reduced number of beams will be subjected to an attack by a given attacker. As a consequence, the attack detection may be performed per beam. When beamforming is not used, the first and second metrics are computed per radio cell by the base station.

In step 330, it is determined whether a triggering condition is met. The triggering condition allows to determine whether there is a suspicion of storm attack over the PRACH based on a result of a comparison of the first metric with the second metric.

Step 330 may include determining that the value of the first metric Rb decreases compared with the value of the second metric Ab and that a decrease ratio is over a threshold Th. The decrease ratio measures the decrease of the value of the first metric with respect to the value of the second metric. The threshold Th may be determined based on values of the first and second metrics computed during a learning phase or a reference period without storm attack.

To be able to compare the variations of the values of the first and second metrics, a KPI may be computed (per beam or per cell) as the ratio:

$KPI1b=Rb/Ab$

The opposite ratio may also be used:

$KPI2b=Ab/Rb$

The triggering condition may be met if this ratio is below a threshold KPI n. In normal mode (i.e. without any attack), the RA procedure activity/profile is determined: a value of KPI1 is extracted and used as threshold KPI1$n$. The threshold KPI n constitutes a reference point for triggering condition verification in step 330 of FIG. 3. The threshold KPI1$n$ is used to determine (initial detection) if there is a suspicion of attack. For each active beam, the triggering condition is: KPI1$b$<KPI1$n$. If the triggering condition is met, a suspicion of attack is detected. Otherwise, if the triggering condition is not met no suspicion is detected.

Other KPIs may be used. The purpose is to use a KPI that allows to compare Rb and Ab and detect a difference between the variations of Rb with respect to the variations of Ab that is below a given threshold (for example below 0.9, 0.8, 0.5, 0.2, 0.1, etc). For example Rb may increase by Rb=10% while Ab increases by Ab=50% giving an increase ratio equal to =0.20. For example Rb may stay unchanged while Ab increases by 400% giving an increase ratio of 0.25.

The objective is here to detect that Rb and Ab do not vary in the same proportion. Without any attack the values of Rb and Ab should vary (increase or decrease) in a similar manner unless the maximum capacity of the base station is reached (e.g. in terms of the maximum number of UEs for which the base station can launch a RA procedure). But in the presence of an attack, Ab may increase significantly while Rb may stay around a maximum value or even decrease.

In step 340, if the triggering condition is met, a PRACH attack detection process is launched to detect whether a storm attack has occurred during the measurement period and/or is still in progress. The detection process allows to confirm whether or not there is a storm attack over the PRACH when a suspicion of storm attack has been determined in step 330. A suspicion of attack may be raised when only one beam is concerned amongst the set of active beams in the cell. The assumption may be that the attacker is only able to conduct the attack in a single beam or a small set of beams (neighboring beams), due to equipment cost.

In step 340 the base station may send one or more messages (e.g. an alarm message) from a layer L1 of a receiver to an upper layer (e.g. L2 layer) of the base station or to an external supervision module.

The one or more messages may include information related to the first and second metrics (e.g. the values of the first and second metrics computed over the measurement period). When beamforming is used, the alarm message may identify a specific beam for which the triggering condition is met. The one or more messages may also include a set of at least one signal parameter of the signals carrying the preambles detected in a specific RACH opportunity window (including the ones with a suspicion) to allow the PRACH attack detection that will be disclosed in details below.

Once the triggering condition on the defined metrics is verified, then the detection process to detect possible PRACH attack is launched. Hereafter, several embodiments of a detection process are disclosed.

PRACH Attack Detection Based on Signal Analysis

In first embodiments #1, the PRACH attack detection process is based on a signal analysis of the detected preambles. Radio samples (e.g. IQ data) of the preambles detected in a preamble search window used by the base station may be captured from antenna array to be analyzed by the base station and/or an external supervision module.

Figure 4:
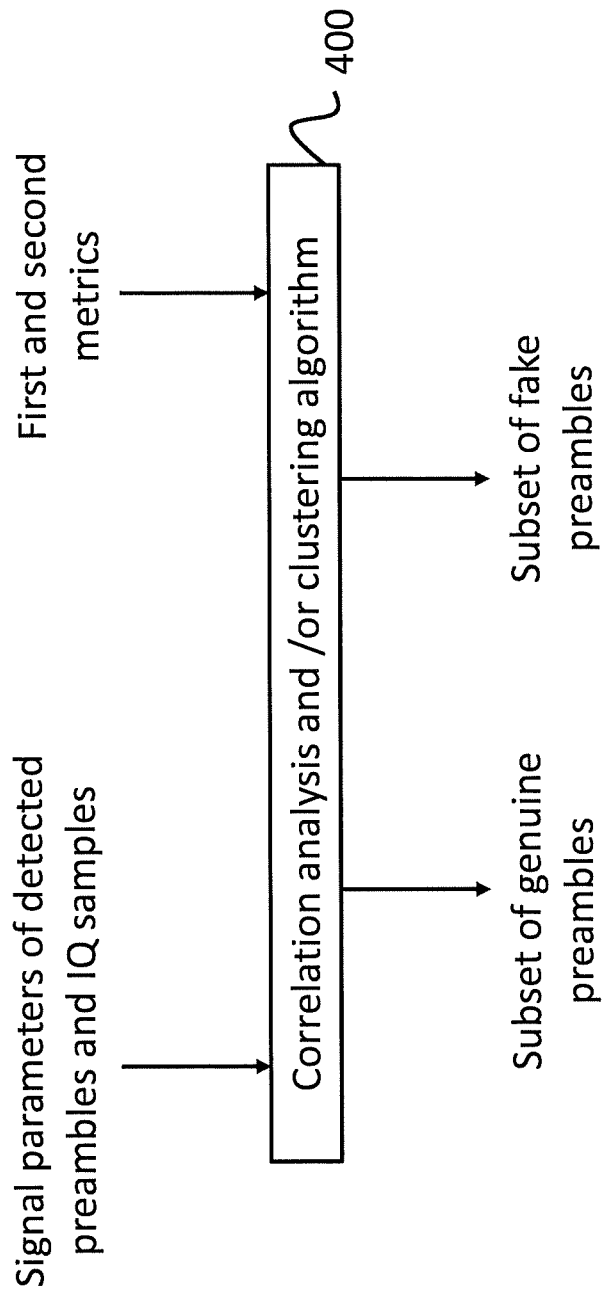
FIG. 4 is a flow diagram illustrating a method for PRACH attack detection according to an example.

As illustrated by FIG. 4, the detection process may include a correlation analysis of the detected preambles and/or a clustering algorithm(s) applied to the preambles.

One or more clustering algorithms may be used to cluster the preambles into clusters (also referred to herein as subsets). Several clustering algorithms may be used in a sequential manner: a second clustering algorithm is used to refine the subsets obtained by a first clustering algorithm, etc. For example, after a first clustering algorithm; a first subset of "possibly fake" preambles and a second subset of "genuine" preambles are obtained. Then a second clustering algorithm is used to detect in the first subsets of "possibly fake" preambles, the "fake" preambles. A correlation analysis may also be used to refine the result of a clustering algorithm. At the end, the detected preambles are clustered into two subsets, a first subset including preambles for which a correlation is detected and a second subset including preambles for which no correlation is detected, wherein the storm attack is confirmed if the size of the first subset is higher than a predefined threshold.

The detection process may generate as output two subsets: a first subset Cg with preamble from genuine UEs and a second subset Cf for fake preambles. The storm attack is confirmed if the second subset Cf is not empty (or the size of the second subset is higher than a predefined threshold, e.g. equal to 0).

The correlation analysis may search for correlation existing between preambles. In fact, if a device of an attacker transmits several preambles in the same window, then there will be high similarity between the received preambles and a correlation can be detected for these preambles. The correlation analysis may be used to identify a subset of "fake" preambles for which a correlation exists (e.g. a correlation level is above a threshold). Alternatively, the correlation analysis may be used to detect whether a subset of preambles that are detected as "possibly fake" by the clustering algorithm are fake or not. If the subset of "fake" preambles is not empty, the attack may be confirmed. Else the attack is not confirmed.

The clustering algorithm may be based on UE signal profiles. Each UE is allowed to send up to one preamble. Several preambles received in the PRACH search window should have different UE signal profiles based on received signal metrics (e.g. pathloss, angle of arrival, received power estimation, SNR (Signal over Noise Ratio), or any other metric that may be extracted from the received signal). A clustering algorithm based on these signal metrics may be applied to get the classification into two subsets of preambles: "possibly fake" and "genuine" preambles. The correlation analysis may be used in combination with the detection of two subsets based on UE profiles to confirm whether the correlation exists within the subset of "possibly fake" preambles and identify the correlated "fake" preamble.

As an example of signal metric, the angle of arrivals may be used for clustering. If the attacker has a fixed position, the angle of arrivals of all preambles sent by the attacker will be the same or very similar. Therefore the angle of arrivals may be used to detect subsets of preambles having substantially the same angle of arrivals. The distribution of the values of the angle of arrivals may be used to detect subsets of preambles. The correlation analysis may be used in combination with the detection of subsets based on the angles of arrival: the correlation analysis may search for correlation existing within one subset to identify the correlated "fake" preambles having substantially the same angle of arrivals while such correlation does not exists for other subsets.

The result of the RA procedure may be used for clustering. A given preamble index may be tagged as "possibly fake" if no signal power (or signal power is below a threshold) is detected on Msg3 despite several retransmission orders from the base station and finally the RA procedure results into a failure. The preambles may thus be clustered into two subsets depending on the result of the RA procedure. The correlation analysis may be used in combination with the detection of subsets based on the result of the RA procedure: the correlation analysis may search for correlation existing within the subset of preambles for which the RA procedure results into a failure to identify the correlated "fake" preambles.

The correlation analysis may be based on an analysis of a set of at least one signal parameter of the signals carrying the detected preambles. The analysis may be performed in time domain and/or in frequency domain. The set of at least one signal parameter may be reported by the PRACH receiver on layer L1 of the base station to layer L2 of the base station and/or to an external supervision module. The set of at least one signal parameter may include for each detected preamble at least one of:
  a signal peak power of the preamble;
  a timing delay of a signal peak in a preamble search window; this time delay corresponds to an initial value of the Time Advance reported to layer L2 of the base station by the PRACH receiver on layer L1 of the base station;
  an angle of arrival of the concerned preamble signal.

The set of at least one signal parameter may further include the time occasion and frequency occasion. But it is assumed that the attacker may change the selection of the time occasion and frequency occasion selected for each preamble index for each PRACH opportunity window.

The correlation analysis may be performed between two or more opportunity windows to detect a correlation between values of the at least one signal parameter of preambles sent during the two or more opportunity windows. The storm attack is confirmed if a correlation is detected between a first set of preambles sent in a first opportunity window and a second set of preambles sent in at least one second opportunity window. A correlation is detected for example if a correlation level is over a correlation threshold.

Different types of correlation may be searched. For example, the attacker may:
  use always the same time delays and power levels for the preambles sent by the attacker from one opportunity window to a next one;
  use always the same time delays but increase the power level step by step from one opportunity window to a next one;
  use always the same power levels but with associated time delays varying from one opportunity window to a next one;
  vary the number of preambles;
  perform any combination of the above, by varying the time delay and/or power level and/or number of preambles.

For example, a preamble index may have always the same timing delay and signal power. In the RA procedure, a genuine UE usually transmit with the same preamble index but with a power increase from one opportunity window to a next one when the genuine UE doesn't receive the message Msg2.

The correlation analysis may search for correlation existing for the values of the time delays and power levels with the objective to detect two subsets of preambles: a first subset including preambles for which a correlation is detected and a second subset including preambles for which no correlation is detected.

An example of clustering algorithm combined with a correlation analysis will be described in the case of a single attacker device. However it can be easily adapted to multiple attacker devices using the same principles.

A first clustering step is based on a first signal metric: here the angle of arrival. The angle of arrival (AoA) is computed for each preamble detected. Preambles belonging to the same range of AoA are put in a same cluster. It provides the creation of first set of clusters (let's assume N clusters) dissociated in the spatial domain. If an attacker is acting, its device should be present in one of these clusters. After this first clustering step, a cluster should contain an abnormal high value of preambles. This cluster, designated as $C'_f$, is selected and assumed to contain the set of fake preambles and possibly genuine preambles spatially co-located with the attacker equipment. It's possible to have several clusters C'$_f$ as cluster candidates.

As an alternative, a combination of different signal metrics (pathloss, received power estimation, SNR (Signal over Noise Ratio), etc) may be used to refine the creation of the initial cluster C'$_f$.

In a second clustering step, a correlation analysis may be performed to identify in the initial clusters C'$_f$ the fake preambles. The correlation analysis may be performed using the Euclidian distance as correlation measure. The Euclidian distance is used to identify the set of fake preambles in the cluster C'$_f$ obtained after the first clustering step. It is assumed that these preambles are subject to the same distortions introduced by the wireless channel. The analysis may be based on Zadoff-Chu sequence correlation as follows.

For a preamble p, a vector $Y_p$ resulting from the multiplication of the preamble p with the conjugate root Zadoff-Chu sequence $z_p$ for the same preamble p may be given by the following equation:

$$Y_p = \begin{bmatrix} y_p(0) \\ y_p(1) \\ \vdots \\ y_p(n) \\ \vdots \\ y_p(L_{RA}-1) \end{bmatrix} = \begin{bmatrix} r_p(0) \times z_p^*(0) \\ r_p(1) \times z_p^*(1) \\ \vdots \\ r_p(n) \times z_p^*(n) \\ \vdots \\ r_p(L_{RA}-1) \times z_p^*(L_{RA}-1) \end{bmatrix} \quad (1)$$

Where:
$r_p$ is the signal received in frequency domain (output of FFT, Fast Fourier Transform) and corresponding to the preamble p detected in time domain;
z*p is the conjugate root Zadoff-Chu sequence $z_p$ for preamble p;
$Y_p$ is the complex vector multiplication output (normalized) with the conjugate root Zadoff-Chu sequence $z_p$ for preamble p;
$L_{RA}$ is the vector length, e.g. $L_{RA}$=139 or 839 depending on the preamble formats configured by the network (cf. 3GPP technical specification 38.211, section 5.3.2);
Then iFFT (inverse Fast Fourrier Transform) is applied to vector $Y_p$ to obtain the vector $X_p$ in temporal domain. For the iFFT, the vector $Y_p$ may be padded with zeros to form 256-length data for $L_{RA}$=139, or 1024-length data for $L_{RA}$=839. The IFFT is applied on $Y_p$ to get the vector $X_p$ in time domain, corresponding to a correlation vector usable for correlation analysis. The powers of correlation vectors (from different antennas in case of antenna array on reception) may be averaged to perform peak detection.

The correlation analysis starts by computing the vectors $X_{Pa}$ and $X_{Pb}$ obtained for 2 preambles $p_a$ and $p_b$ detected. The 2 preambles $p_a$ and $p_b$ may be arbitrarily selected. The Euclidian distance $d_{Pa,Pb}$ is computed between the two vectors $X_{Pa}$ and $X_{Pb}$ (cf. equation 2) and compared to a threshold.

$$d_{Pa,Pb} = \|X_{Pa} - X_{Pb}\|^2 \quad (2)$$

If the $d_{Pa,Pb}$ value is lower than the threshold, the preambles $p_a$ and $p_b$ are put in the same cluster that is designated by $C_f$. Else the preambles $p_a$ and $p_b$ are put in 2 different clusters: $C_g$ and $C_f$. Initially, these clusters are empty. After this stage, the 2 preambles processed are removed from C'$_f$.

In an iterative way, a vector $X_{Pc}$ is obtained for a next preamble $p_c$ taken from C'$_f$ and the Euclidian distance is computed with the vector obtained for a preamble in cluster $C_f$. If the Euclidian distance value is lower than the threshold, the preamble $p_c$ is put in cluster $C_f$. Else the preamble $p_c$ is put in $C_g$. This iterative processing ends up to the processing of the last preamble available in C'$_f$.

At the end of this algorithm, 2 clusters are formed: $C_f$ with the preambles with a significant correlation (e.g. a correlation level above a threshold): the preambles for which the Euclidian distance $d_{Xa,Xb}$ value between two of them is lower to the threshold and another one ($C_g$) with no significant correlation between them (i.e. Euclidian distance is higher to the threshold). The first cluster is assumed to contain the set of fake preambles. The second cluster contains the remaining genuine preambles, extracted from C'$_f$.

It could be possible $C_f$ is empty. If so, the algorithm restarts by selecting another candidate of C'$_f$.

Optionally, in a third step, the result of a RAP for each valid preamble may be used to consolidate the 2 clusters obtained after the correlation analysis. Each cluster may be refined (element removed or added) according to a decoding result of Msg3 in next frames. For example, if it is assumed that the attacker does not send any message Msg3, a preamble, that is present in $C_g$ but for which no signal power is detected for Msg3 transport block, is added to $C_f$. Likewise, a preamble, that is present in $C_f$ but for which a signal power is detected for Msg3 transport block, is added to $C_g$. Also the RAP may be stopped for each preamble put in $C_f$ so as to save resources of the base station.

The correlation analysis and/or clustering may be performed by the base station or by a supervision module to which the set of parameters of the detected preambles is reported to confirm or not the attack on PRACH. This supervision module may be hosted in any network entity, for example in the RIC interfaced with O-RAN standard.

For example the supervision module at RIC processes the information and/or radio samples (e.g. radio samples of the baseband signal received by the antenna(s), e.g. by multiple antennas) received from the base station. These radio samples may correspond to antenna signal used for suspected preambles detection in the preamble search window.

The main advantage of the first embodiment #1 relies on the usage of existing parameters and do not require radio cell parameters reconfiguration as the second embodiment #2 (that will be described below) which could be detrimental to genuine UEs. Furthermore, with the first embodiment #1, the resolution of the attack may be simplified because the base station may simply not trigger any random access procedure for preambles classified into the subset of fake preambles.

PRACH Attack Detection Based on Radio Cell Coverage Reduction

In second embodiments #2, the PRACH attack detection process is based on radio cell parameters reconfiguration causing a reduction of the radio cell coverage. The second embodiments #2 require less processing resources than the first embodiments #1 since the second embodiments #2 does not include any radio samples processing. Also with the second embodiments #2, the QoS could be degraded as the radio cell coverage is reduced and some genuine UEs in CONNECTED state may be lost. But if the attack is not detected it could lead to a full DoS (Deny of Service) or require a radio cell lock/unlock or beam reset or cell reset or possibly a reset of the base station.

In the second embodiments #2, a configuration parameter impacting to preambles sent through the PRACH is changed in order to reduce the radio cell coverage of the base station. The configuration parameter is a radio cell coverage configuration parameter and may be at least one of: a target beam power (minimum power to be used for sending a preamble) and a SSB threshold (e.g. see parameter rsrp-ThresholdSSB).

The configuration parameter may be changed in one shot or step by step. The base station informs the devices of the change of configuration parameter by sending during phase 100A at least one synchronization signal including the modified value of the configuration parameter to be used for the next transmission of preambles through the PRACH. For example, the change of the value of the configuration parameter is notified to the UEs by reconfiguring the radio cell via update of SIB1 information.

For example, if the configuration parameter is the target beam power, the target beam power may be reduced step by step.

Figure 5:
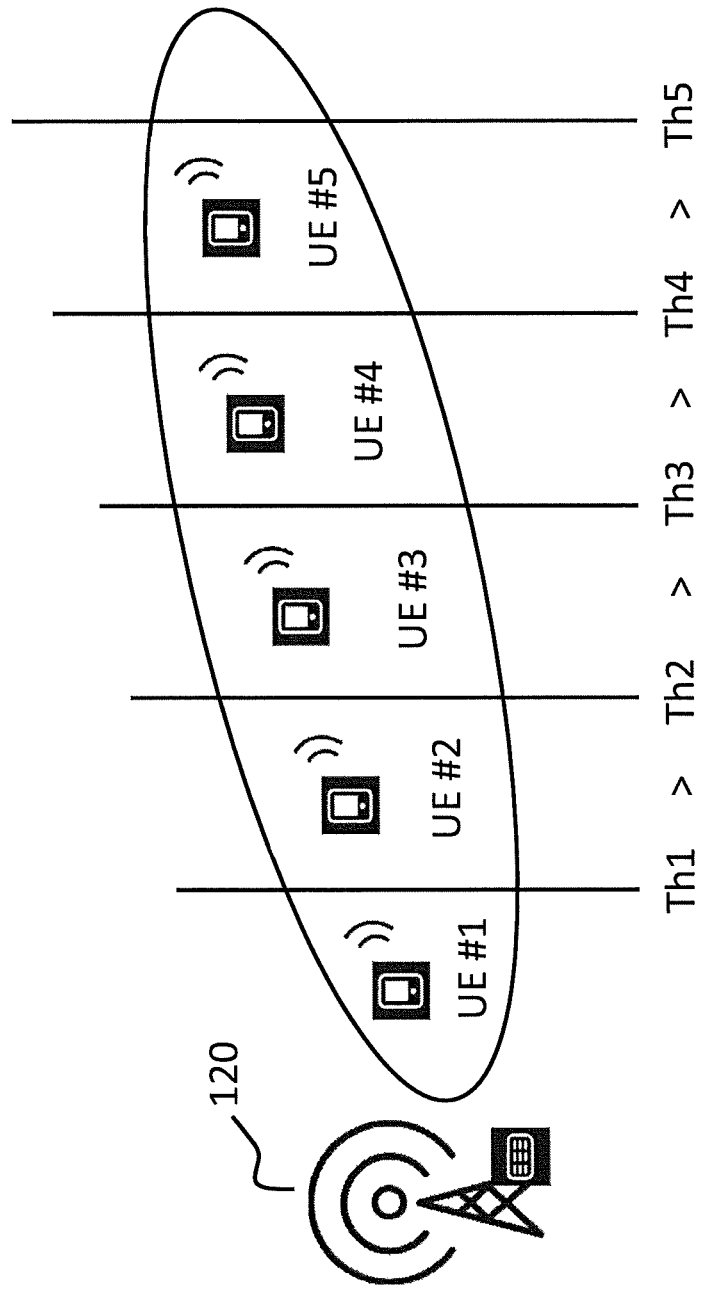
FIG. 5 is a schematic diagram illustrating aspects of a PRACH attack detection process according to an example.

For example, if the configuration parameter is the SSB threshold, the SSB threshold (e.g. rsrp-ThresholdSSB) may be set to a first value Th5, sequentially and step by step increased to Th4, Th3, Th2, Th1 as illustrated by FIG. 5, such that $$Th5 < Th4 < Th3 < Th2 < Th1$$

and such that the radio cell coverage is here also reduced at each step.

By reducing step by step the cell coverage, the base station may detect (e.g. based on the beam power measurement (e.g. RSRP, Reference Signals Received Power) and/or time delay of the PRACH signal sent by the device) at some step that a device falls outside the radio cell coverage, but continues to send preambles through the PRACH to try to be connected to this radio cell without taking into account the modified value of the parameter.

On the contrary, a genuine UE would try to connect to via another beam (if beamforming is used) or another cell (if no beamforming is used) because its SSB power is too low compared to a SSB threshold.

Also if preambles are transmitted by genuine UEs, a subset of these preambles shall be not detected and the volume of preambles detected is reduced. This change may be detected by counting the number of detected preambles within an opportunity window or a preamble search window which is used by the base station to detect the preamble sent in step 101 within an opportunity window.

If the detailed information on set of suspected preambles remains unchanged on timing delay that shall not be identified, the attack is confirmed due to this incoherence. In other case, attacker may take into account the change of the configuration parameter. Then the attacker can adjust the attack by changing the transmission delays of the fake preambles. If the same number of preambles is detected, the attack may be confirmed as well.

The configuration parameter rsrp-ThresholdSSB may be set per beam differently and the use of a dedicated value of rsrp-ThresholdSSB for each beam is compatible with a future evolution of the standard.

If an attacker is present, the base station may make a determination that the attacker's device, while falling outside the radio cell coverage, continues to send preambles through the PRACH to request access to the radio access network via the radio cell managed by the base station, without taking into account the modified value of the configuration parameter. A genuine UE would normally have detected that it is outside the radio cell coverage of the base station and would have tried to request connection through another radio cell or another beam.

While the configuration parameter is changed (step by step or in one shot), the base station may continue to compute the value of the first and second metrics to determine whether the suspicion of attack is still detected.

Based on the determination that the attacker's device continues to send preambles through the PRACH, the base station can confirm that this device is the device of an attacker. A PRACH attack may thus be confirmed and detected.

When beamforming is used (such that the radio cell coverage of the base station corresponds to a radio coverage of a set of beams), the beam on which the PRACH attack occurs may be identified by means of the first and second metrics Rb and Ab: a beam is concerned by the PRACH attack if the triggering condition is met for this specific beam. In such a case, instead of reducing the radio cell coverage in all directions, the modified value of the configuration parameter is transmitted only through the concerned beam and associated SSBs for which a suspicion of storm attack has been detected in phase A based on the first and second metrics Rb and Ab so as to reduce the radio cell coverage selectively in the direction of the concerned beam.

Figure 6:
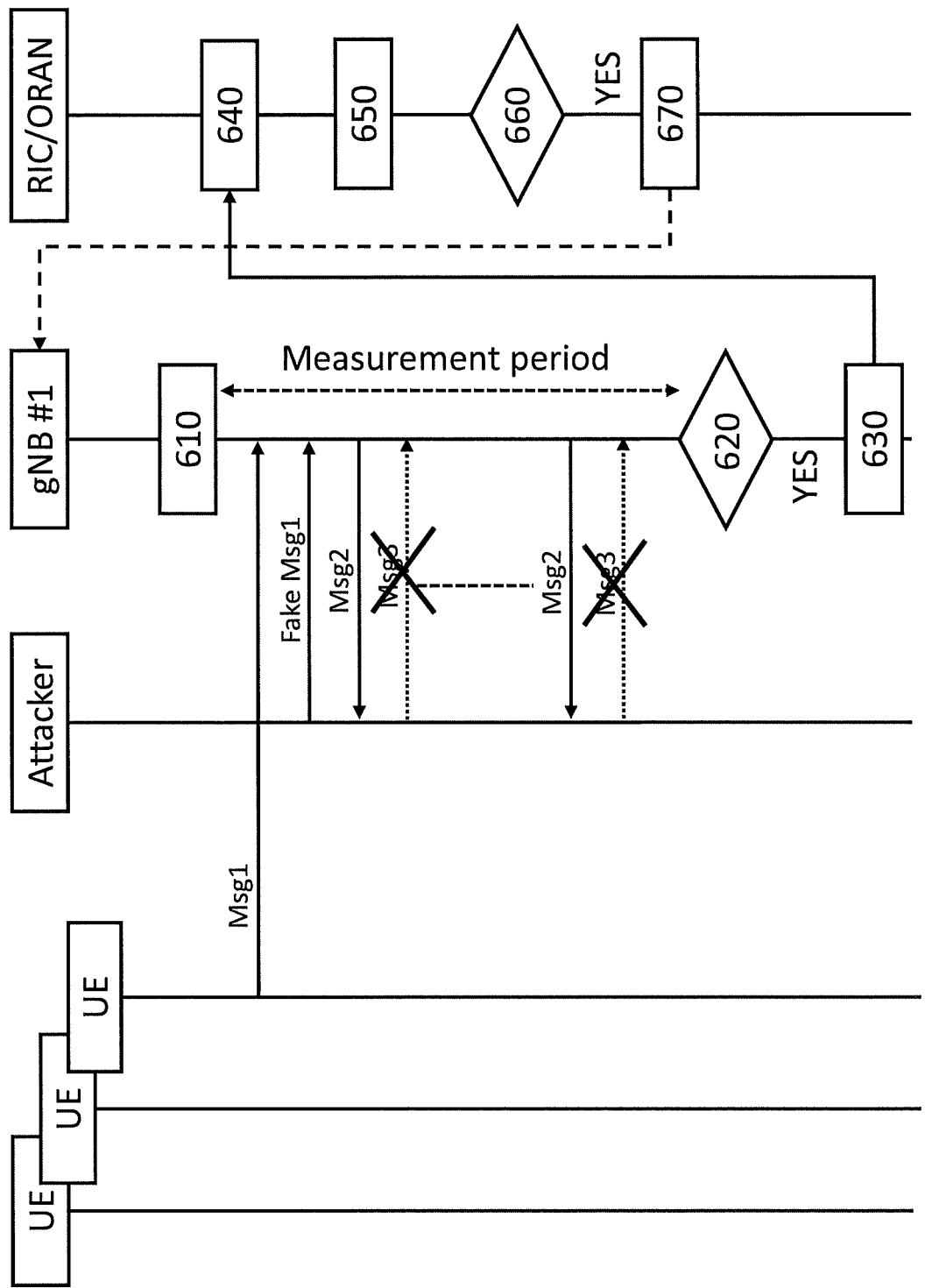
FIG. 6 is a flow diagram illustrating a method for PRACH attack detection according to an example.

FIG. 6 is a flow diagram showing the interaction between the various entities for triggering the PRACH attack detection process and implementing the PRACH attack detection process according to an example. The PRACH attack detection process is implemented by a supervision module. The supervision module may be within a RIC or OAM (Operation Administration and Maintenance) or another entity within the network.

In step 610, the first and second metrics Rb and Ab are computed by a base station for a measurement period. During this measurement period, an attacker may send fake preambles but it is assumed that no Msg3 is sent by the attacker. The metrics may be computed per beam or per cell.

In step 620, the base station determines whether a triggering condition for launching a PRACH attack detection process is met on the basis of a comparison of the values of the first and second metrics Rb and Ab obtained in step 610. If the triggering condition is met, a suspicion of attack is detected and step 630 is executed after step 620 if the triggering condition is met.

In step 630, the base station reports a set of measurement data to the supervision module. The set of measurement data may include:
- the values of the first and second metrics Rb and Ab obtained in step 610 for the measurement period; and/or
- a set of at least one preamble signal parameters (e.g. power of a signal peak, time delay of signal peak, angle of arrival) determined by the base station; and/or
- radio samples (or at least a subset of radio samples) of the preambles detected during the measurement period.

In step 640, the supervision module receives the set of measurement data.

In step 650, the supervision module launches a signal analysis (correlation analysis and/or clustering based on one of embodiments #1) based on the set of measurement data to confirm or not the PRACH attack.

In step 660, if the PRACH attack has been confirmed in step 650, step 670 is executed after step 660.

In step 670, a resolution of the attack is implemented. For example, the resolution may include: not launching any RA procedure for the detected fake preambles and/or sending a technician on site to locate and remove the attacking device.

Figure 7:
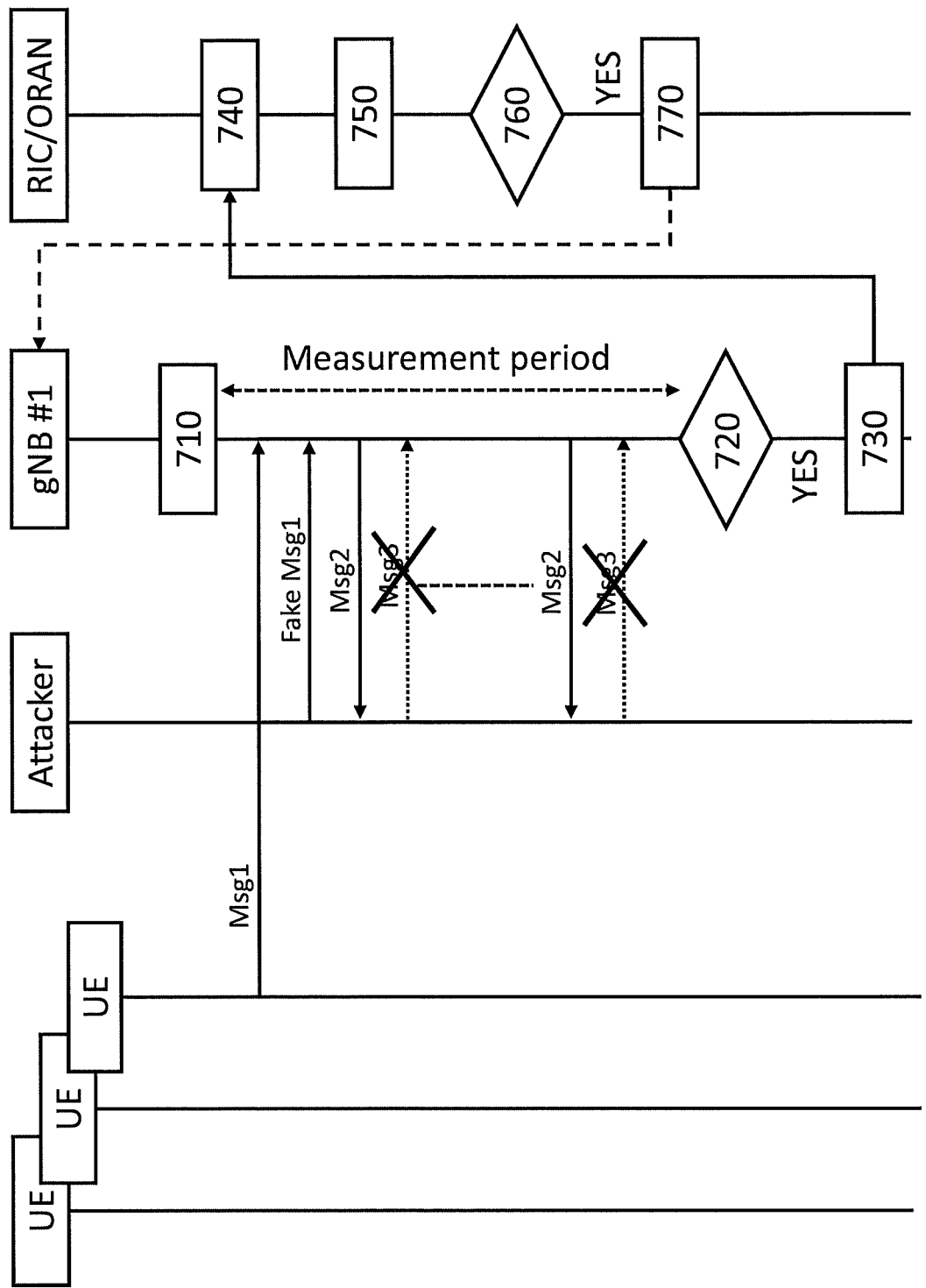
FIG. 7 is a flow diagram illustrating a method for PRACH attack detection according to an example.

FIG. 7 is a flow diagram showing the interaction between the various entities for triggering the PRACH attack detection process and implementing the PRACH attack detection process according to an example. The PRACH attack detection process is implemented by a supervision module. The supervision module may be within a RIC or OAM (Operation Administration and Maintenance) or another entity within the network.

In step 710, the first and second metrics Rb and Ab are computed by a base station for a measurement period. During this measurement period, an attacker may send fake preambles but it is assumed that no Msg3 is sent by the attacker. The metrics may be computed per beam or per cell.

In step 720, the base station determines whether a triggering condition for launching a PRACH attack detection process is met on the basis of a comparison of the values of the first and second metrics Rb and Ab obtained in step 710. If the triggering condition is met, a suspicion of attack is detected and step 730 is executed after step 720 if the triggering condition is met.

In step 730, the base station reports a set of measurement data to a supervision module The set of measurement data may include:
  the values of the first and second metrics Rb and Ab obtained in step 710 for the measurement period;
  a set of at least one preamble signal parameters (e.g. power of a signal peak, time delay of signal peak, angle of arrival) determined by the base station; and/or
  radio samples (or at least a subset of radio samples) of the preambles detected during the measurement period. In step 740, the supervision module receives the set of measurement data.

In step 750, the supervision module sends a request to the base station to request radio cell parameters reconfiguration causing a reduction of the radio cell coverage (based on one of embodiments #2). The supervision module will then wait for the new values of the first and second metrics to determine whether the suspicion of attack is confirmed after reduction of the radio cell coverage.

In step 760, if the PRACH attack has been confirmed in step 750, step 770 is executed after step 760.

In step 770, a resolution of the attack is implemented. For example, the resolution may include: not launching any RA procedure for the detected fake preambles and/or sending a technician on site to locate and remove the attacking device.

Existing O-RAN/RIC architecture with its existing interfaces with base stations (e.g. gNBs) can easily integrate a PRACH attack detection process disclosed herein. The integration may be performed in at least two manners.

According to a first approach, the PRACH attack detection process is implemented at gNB level: in this scheme the gNB is able to support the proposed PRACH attack detection process using available information at gNB. This procedure will then run in near real time manner but at the cost of additional computational efforts that should be supported at gNB.

Figure 8:
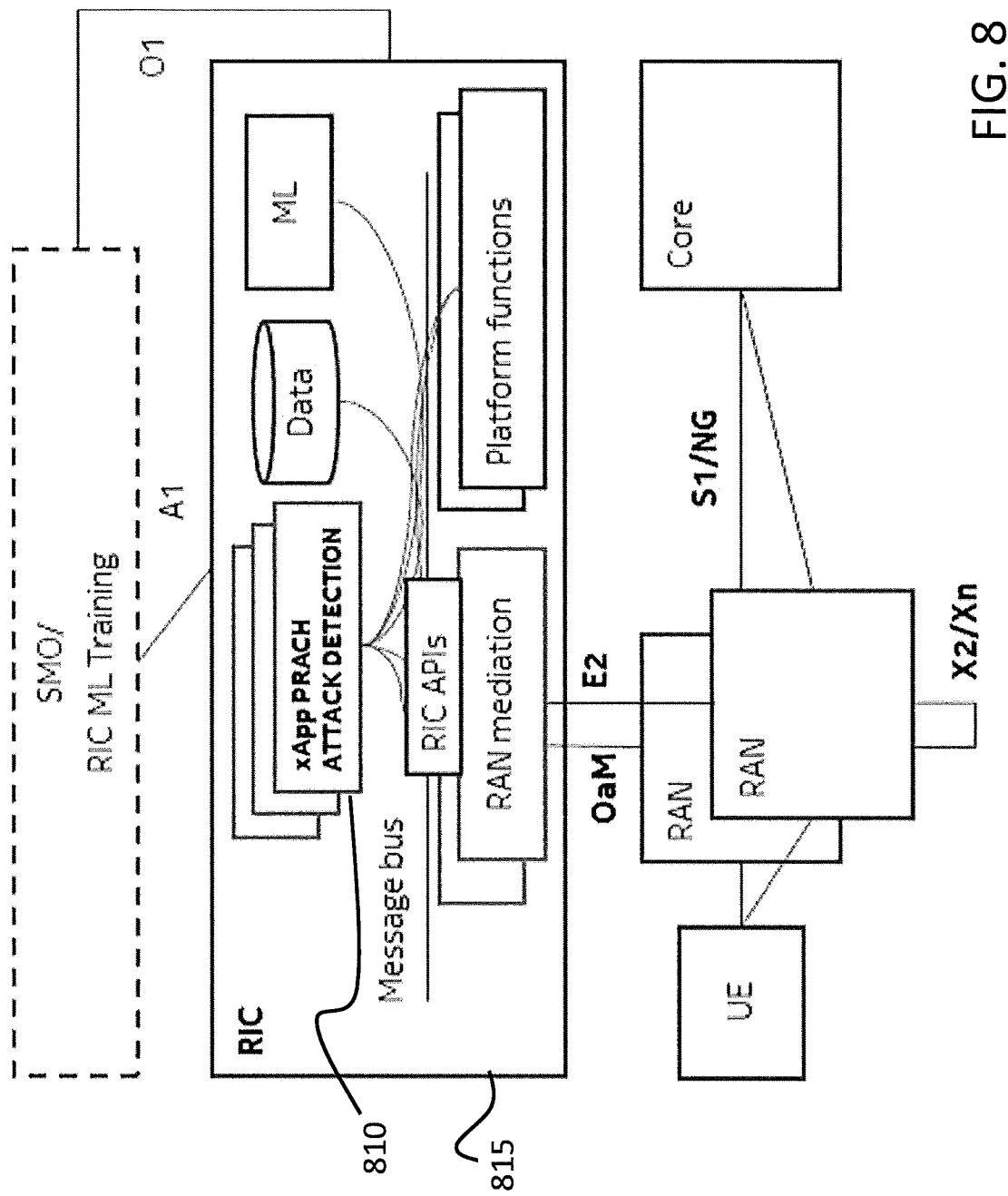
FIG. 8 is a block diagram illustrating an exemplary architecture of a communication system according to an example.

According to a second approach, the PRACH attack detection is implemented at O-RAN/RIC level. Another possibility offered by the established O-RAN/RIC framework is to make use of the existing interfaces and capabilities of the O-RAN/RIC in order to run the RACH attack detection method as a software tool (e.g. an xAPP that may be used by a RIC to manage network functions). The necessary data collected from the gNB may be transferred to the xAPP via the interface E2 as depicted in FIG. 8. FIG. 8 provides a detailed view of the network architecture with our method running as an xAPP 810 within a RIC 815.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or apparatus, whether or not such computer or processor is explicitly shown.

Although a flow chart may describe operations as a sequential process, many of the operations may be performed in parallel, concurrently or simultaneously. Also some operations may be omitted, combined or performed in different order. A process may be terminated when its operations are completed but may also have additional steps not disclosed in the figure or description. A process may correspond to a method, function, procedure, subroutine, subprogram, etc. When a process corresponds to a function, its termination may correspond to a return of the function to the calling function or the main function.

Each described function, engine, block, step described herein can be implemented in hardware, software, firmware, middleware, microcode, or any suitable combination thereof.

When implemented in software, firmware, middleware or microcode, instructions to perform the necessary tasks may be stored in a computer readable medium that may be or not included in a host apparatus or host system. The instructions may be transmitted over the computer-readable medium and be loaded onto the host apparatus or host system. The instructions are configured to cause the host apparatus/host system to perform one or more functions disclosed herein. For example, as mentioned above, according to one or more examples, at least one memory may include or store instructions, the at least one memory and the instructions may be configured to, with at least one processor, cause the host apparatus or host system to perform the one or more functions. Additionally, the processor, memory and instructions, serve as means for providing or causing performance by the host apparatus or host system of one or more functions disclosed herein.

The host apparatus or host system may be a general-purpose computer and/or computing system, a special purpose computer and/or computing system, a programmable processing apparatus and/or system, a machine, etc. The host apparatus or host system may be or include or be part of: a user equipment, client device, mobile phone, laptop, computer, network element, data server, network resource controller, network apparatus, router, gateway, network node, computer, cloud-based server, web server, application server, proxy server, etc.

Figure 9:
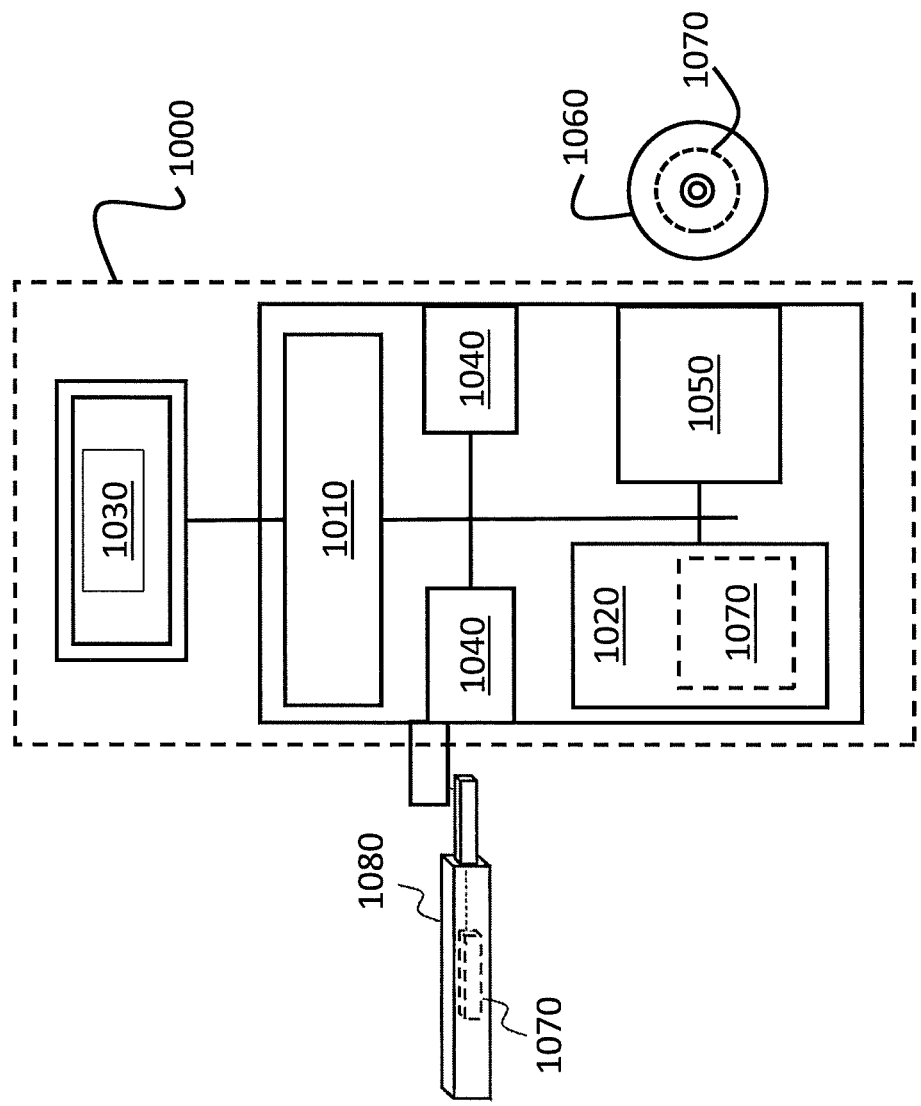
FIG. 9 is a block diagram illustrating an exemplary architecture of an apparatus according to an example.

FIG. 9 illustrates an example embodiment of an apparatus 1000. The apparatus 1000 may be a host apparatus or be part of a host system as disclosed herein. The apparatus 1000 may be (or be part of) a base station or network entity as disclosed herein.

The apparatus 1000 may include at least one processor 1010 and at least one memory 1020. The apparatus 1000 may include one or more communication interfaces 1040 (e.g. network interfaces for access to a wired/wireless network, including Ethernet interface, WIFI interface, USB interfaces etc) connected to the processor and configured to communicate via wired/non wired communication link(s). The apparatus 1000 may include other associated hardware such as user interfaces 1030 (e.g. keyboard, mouse, display screen, etc) connected with the processor. The apparatus 1000 may further include one or more media drives 1050 for reading a computer-readable storage medium (e.g. digital storage disc 1060 (CD-ROM, DVD, Blue Ray, etc), USB key 1080, etc). The processor 1010 is connected to each of the other components 1030, 1040, 1050 in order to control operation thereof.

The memory 1020 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 1020 may be configured to store, amongst other things, an operating system of the apparatus 1000 and/or one or more computer program code of one or more software applications. The RAM of the memory 1020 may be used by the processor 1010 for the temporary storage of data.

The processor 1010 may be configured to store, read, load, execute and/or otherwise process instructions 1070 stored in a computer-readable storage medium 1060, 1080 and/or in the memory 1020 such that, when the instructions are executed by the processor, causes the apparatus 1000 to perform one or more or all steps of a method described herein for the concerned apparatus 1000.

The instructions may correspond to computer program instructions, computer program code and may include one or more code segments. A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

When provided by a processor, the functions may be provided by a single dedicated processor, by a single shared processor, or by a plurality of individual processors, some of which may be shared. The term "processor" should not be construed to refer exclusively to hardware capable of executing software and may implicitly include one or more processing circuits, whether programmable or not. A processor or likewise a processing circuit may correspond to a digital signal processor (DSP), a network processor, an application specific integrated circuit (ASIC), a field programmable gate array (FPGA), a System-on-Chips (SoC), a Central Processing Unit (CPU), a quantum processor, an arithmetic logic unit (ALU), a programmable logic unit (PLU), a processing core, a programmable logic, a microprocessor, a controller, a microcontroller, a microcomputer, any device capable of responding to and/or executing instructions in a defined manner and/or according to a defined logic. Other hardware, conventional or custom, may also be included. A processor or processing circuit may be configured to execute instructions adapted for causing the host apparatus or host system to perform one or more functions disclosed herein for the host apparatus or host system.

A computer readable medium or computer readable storage medium may be any storage medium suitable for storing instructions readable by a computer or a processor. A computer readable medium may be more generally any storage medium capable of storing and/or containing and/or carrying instructions and/or data. A computer-readable medium may be a portable or fixed storage medium. A computer readable medium may include one or more storage device like a permanent mass storage device, magnetic storage medium, optical storage medium, digital storage disc (CD-ROM, DVD, Blue Ray, etc), USB key or dongle or peripheral, memory card, random access memory (RAM), read only memory (ROM), core memory, flash memory, or any other non-volatile storage.

A memory suitable for storing instructions may be for example: a random access memory (RAM), read only memory (ROM), a permanent mass storage device such as a disk drive, a hard disk drive (HDD), a solid state drive (SSD), a memory card, a random access memory (RAM), a read only memory (ROM), a core memory, a flash memory, or any combination thereof.

In the present description, the wording "means configured to perform one or more functions" or "means for performing one or more functions" may correspond to one or more functional blocks comprising circuitry that is adapted for performing or configured to perform the concerned function(s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause a host apparatus or host system to perform the concerned function(s).

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
 (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The circuitry may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via one or more communication networks.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF MAIN ABBREVIATIONS

BTS Base Station
KPI Key Performance Indicator
MIB Master Information Block
OFDM Orthogonal frequency division multiplexing
O-RAN Open Radio Access Network
PRACH Physical Random Access Channel
RIC Radio Intelligent Controller
SIB System Information Broadcast
SSB Synchronization Signal Block
UE User Equipment

The invention claimed is:

1. A method, comprising:
detecting, with a base station, a plurality of preambles sent by devices through a physical random access channel;
launching, with the base station, a random access procedure for at least one device for which a preamble has been detected;
decoding, with the base station, at least one radio resource control connection request received in the context of a launched random access procedure;
determining, with the base station, a first metric and a second metric, wherein the first metric is a number of radio resource control connection requests successfully decoded over a period of time, wherein the second metric is a number of preambles detected over the same period of time and for which a random access procedure has been launched;
based, at least partially, on a comparison of the first metric with the second metric, determining whether there is a suspicion of storm attack over the physical random access channel, where the comparison comprises at least one of: determining that a value of the first metric decreases compared with a value of the second metric, and determining that a decrease ratio of the value of the first metric compared with the value of the second metric is over a threshold; and
based on the determining that there is a suspicion of storm attack, launching a physical random access channel attack detection process.

2. The method according to claim 1, wherein the first metric and the second metric are determined per beam when several beams are deployed for defining a radio cell coverage of the base station.

3. The method according to claim 1, wherein determining whether there is a suspicion of storm attack includes determining that the value of the first metric decreases compared with the value of the second metric and the decrease ratio is over the threshold.

4. The method according to claim 3, wherein the threshold is determined based on values of the first and second metrics computed during a learning phase without storm attack.

5. The method according to claim 1, comprising:
sending a message from a physical layer to an upper layer, the message including information related to the first and second metrics.

6. The method according to claim 1, wherein the detection process is based on an analysis of parameters of signals carrying the detected preambles, wherein the parameters include at least one of a power of a signal peak, a timing delay of a signal peak in a random access channel search window, or an angle of arrival of the concerned signal.

7. The method according to claim 6, wherein the analysis includes a correlation analysis between two or more opportunity windows to detect a correlation between values of at least one signal parameter of preambles sent during the two or more opportunity windows,
wherein the storm attack is confirmed if a correlation is detected between a first set of preambles sent in a first opportunity window and a second set of preambles sent in at least one second opportunity window,
wherein the at least one signal parameter includes at least one of: a time delay within a preamble search window of a signal peak detected for the concerned preamble or a signal power of a signal peak detected for the concerned preamble.

8. The method according to claim 6, wherein the detection process includes a clustering of the detected preambles into two subsets, the first subset including preambles for which a correlation is detected and a second subset including preambles for which no correlation is detected, wherein the storm attack is confirmed if the size of the first subset is higher than a predefined threshold.

9. The method according to claim 6, wherein implementing the detection process includes:
modifying a value of a configuration parameter applicable to preambles sent through the physical random access channel so as to reduce a radio cell coverage of the base station;
sending with the base station at least one synchronization signal including the modified value of the configuration parameter;

making a determination that a device falling outside the radio cell coverage continues to send preambles through the physical random access channel without taking into account the modified value of the configuration parameter; and determining that the device falling outside the radio cell coverage is an attacker device based on the determination.

10. The method according to claim 9, wherein the configuration parameter includes at least one of a target beam power or a synchronization signal block threshold.

11. The method according to claim 9, wherein the radio cell coverage of the base station corresponds to a radio coverage of a set of beams, wherein the modified value of the configuration parameter is transmitted through a subset of at least one beam for which a suspicion of storm attack has been detected so as to reduce the radio cell coverage selectively in the direction of the at least one beam.

12. A base station, the base station comprising:
at least one processor; and
at least one memory storing instructions that, when executed with the at least one processor, cause the base station to perform:
detecting, with the base station, a plurality of preambles sent by devices through a physical random access channel;
launching, with the base station, a random access procedure for at least one device for which a preamble has been detected;
decoding, with the base station, at least one radio resource control connection request received in the context of a launched random access procedure;
determining, with the base station, a first metric and a second metric, wherein the first metric is a number of radio resource control connection requests successfully decoded over a period of time, wherein the second metric is a number of preambles detected over the same period of time for which a random access procedure has been launched;
based, at least partially, on a comparison of the first metric with the second metric, determining whether there is a suspicion of storm attack over the physical random access channel, where the comparison comprises at least one of: determining that a value of the first metric decreases compared with a value of the second metric, and determining that a decrease ratio of the value of the first metric compared with the value of the second metric is over a threshold; and
based on the determining that there is a suspicion of storm attack, launching a physical random access channel attack detection process.

13. A non-transitory computer-readable medium storing computer-executable instructions that, when executed with at least one processor at a base station, cause the base station to perform a method comprising:
detecting, with a base station, a plurality of preambles sent by devices through a physical random access channel;
launching, with the base station, a random access procedure for at least one device for which a preamble has been detected;
decoding, with the base station, at least one radio resource control connection request received in the context of a launched random access procedure;
determining, with the base station, a first metric and a second metric, wherein the first metric is a number of radio resource control connection requests successfully decoded over a period of time, wherein the second metric is a number of preambles detected over the same period of time for which a random access procedure has been launched;
based, at least partially, on a comparison of the first metric with the second metric, determining whether there is a suspicion of storm attack over the physical random access channel, where the comparison comprises at least one of: determining that a value of the first metric decreases compared with a value of the second metric, and determining that a decrease ratio of the value of the first metric compared with the value of the second metric is over a threshold; and
based on the determining that there is a suspicion of storm attack, launching a physical random access channel attack detection process.

* * * * *